United States Patent [19]

Gutris

[11] 4,336,470
[45] Jun. 22, 1982

[54] ROTARY ELECTRIC MACHINE OF THE IN-OUT TYPE PROVIDED WITH INTEGRAL STATOR SUPPORTING MEANS, COMPONENT FOR SAID MACHINE AND METHOD FOR ASSEMBLING THE SAME

[76] Inventor: Giorgio Gutris, 231.6.2 Avenida de 27 de Enero, Premia de Mar, Spain

[21] Appl. No.: 85,958

[22] Filed: Oct. 18, 1979

Related U.S. Application Data

[63] Continuation of Ser. No. 804,755, Jun. 8, 1977, abandoned.

[30] Foreign Application Priority Data

Jun. 15, 1976 [IT] Italy ................................ 24283 A/76

[51] Int. Cl.³ ............................................ H02K 15/00
[52] U.S. Cl. .................................... 310/42; 310/67 R
[58] Field of Search ...................... 310/67, 254, 89, 42

[56] References Cited

U.S. PATENT DOCUMENTS 4,129,796  12/1978  Papst et al. ...................... 310/67 X Primary Examiner—Donovan F. Duggan
Attorney, Agent, or Firm—Wenderoth, Lind & Ponack

[57] ABSTRACT

A rotary electric machine of the in-out type, comprising an inner stator having a core of ferromagnetic material which comprises essentially planar opposed faces and an outer rotor supported for rotation coaxially about the stator, further includes a stationary supporting structure connected to the stator by at least one rigid intermediate component abutting on and secured to one of the planar faces.

23 Claims, 17 Drawing Figures

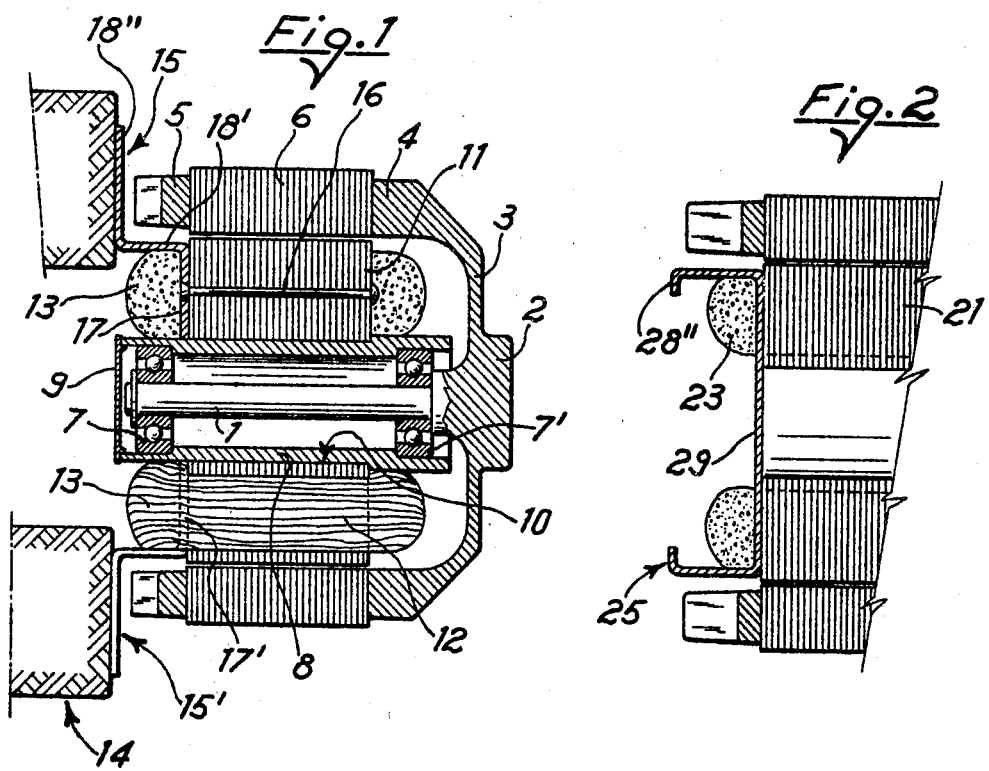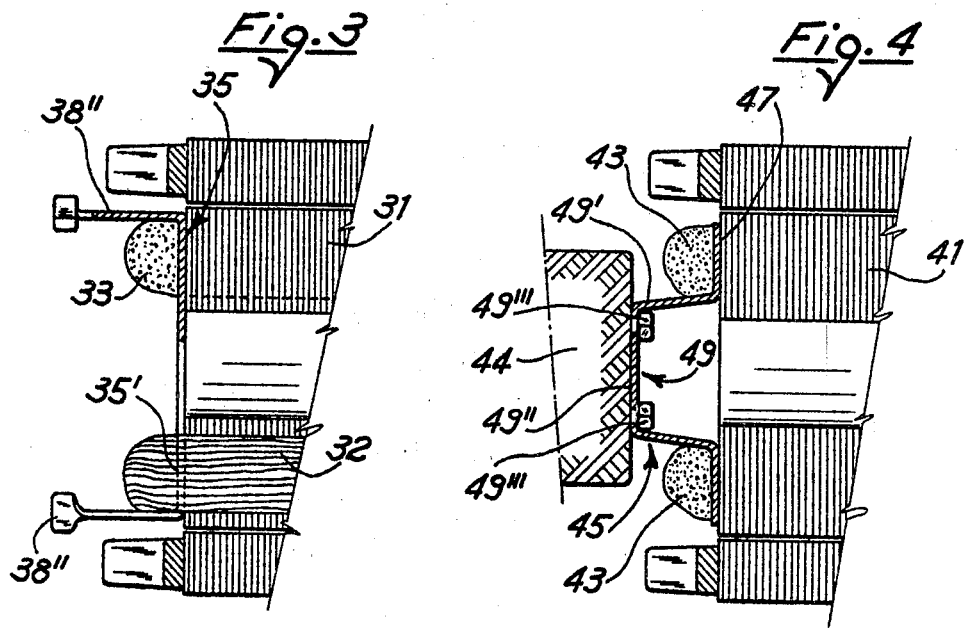

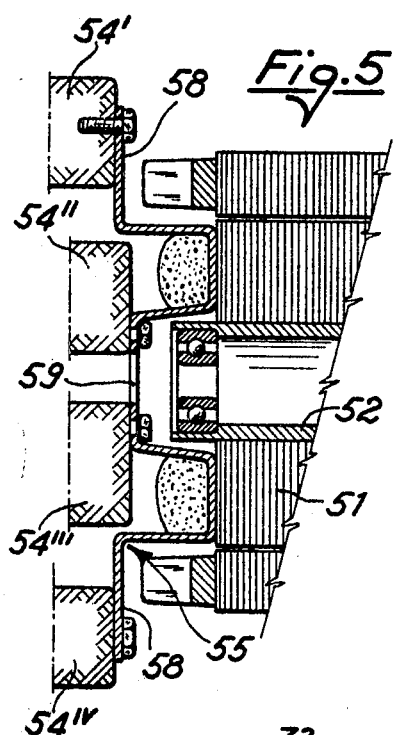
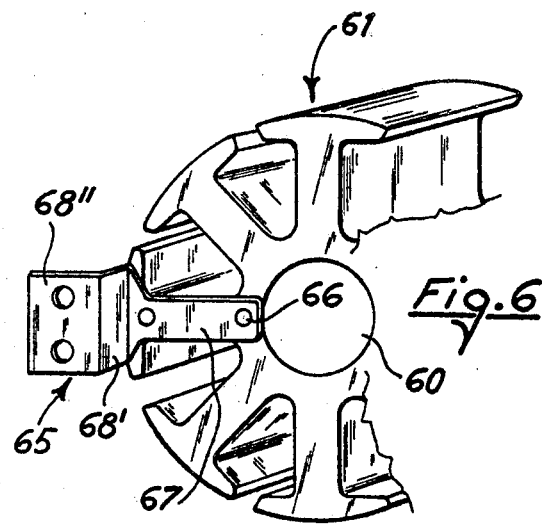
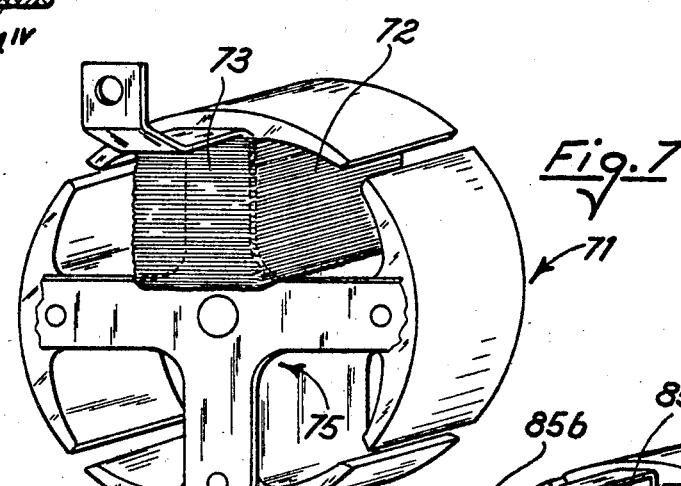
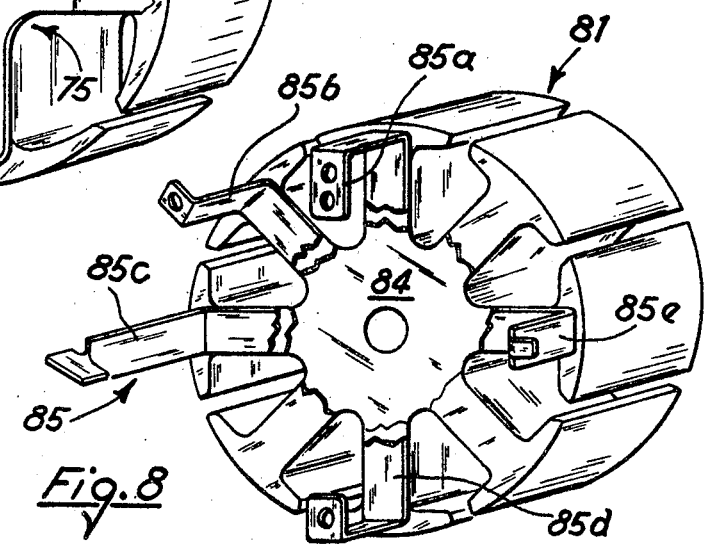

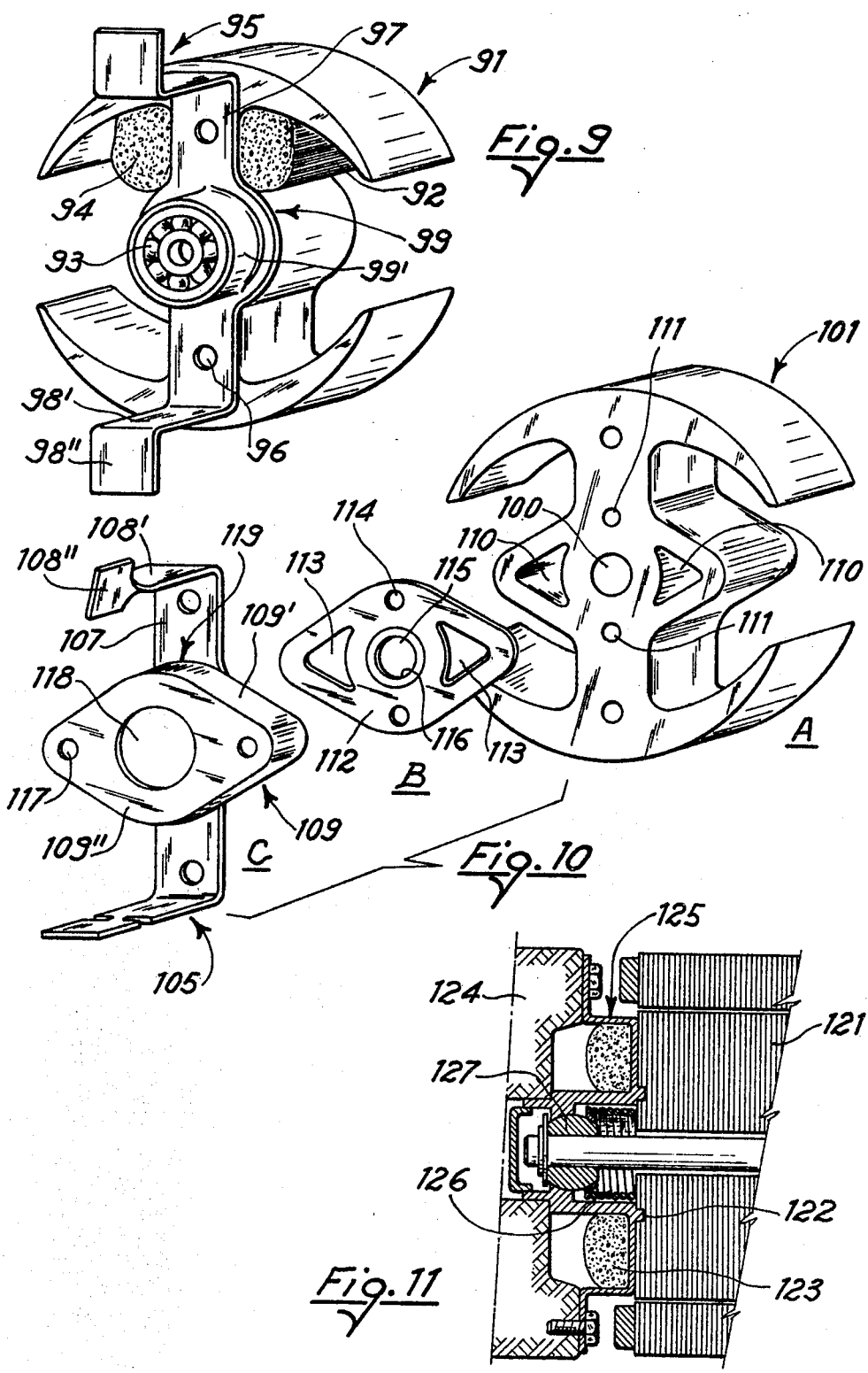

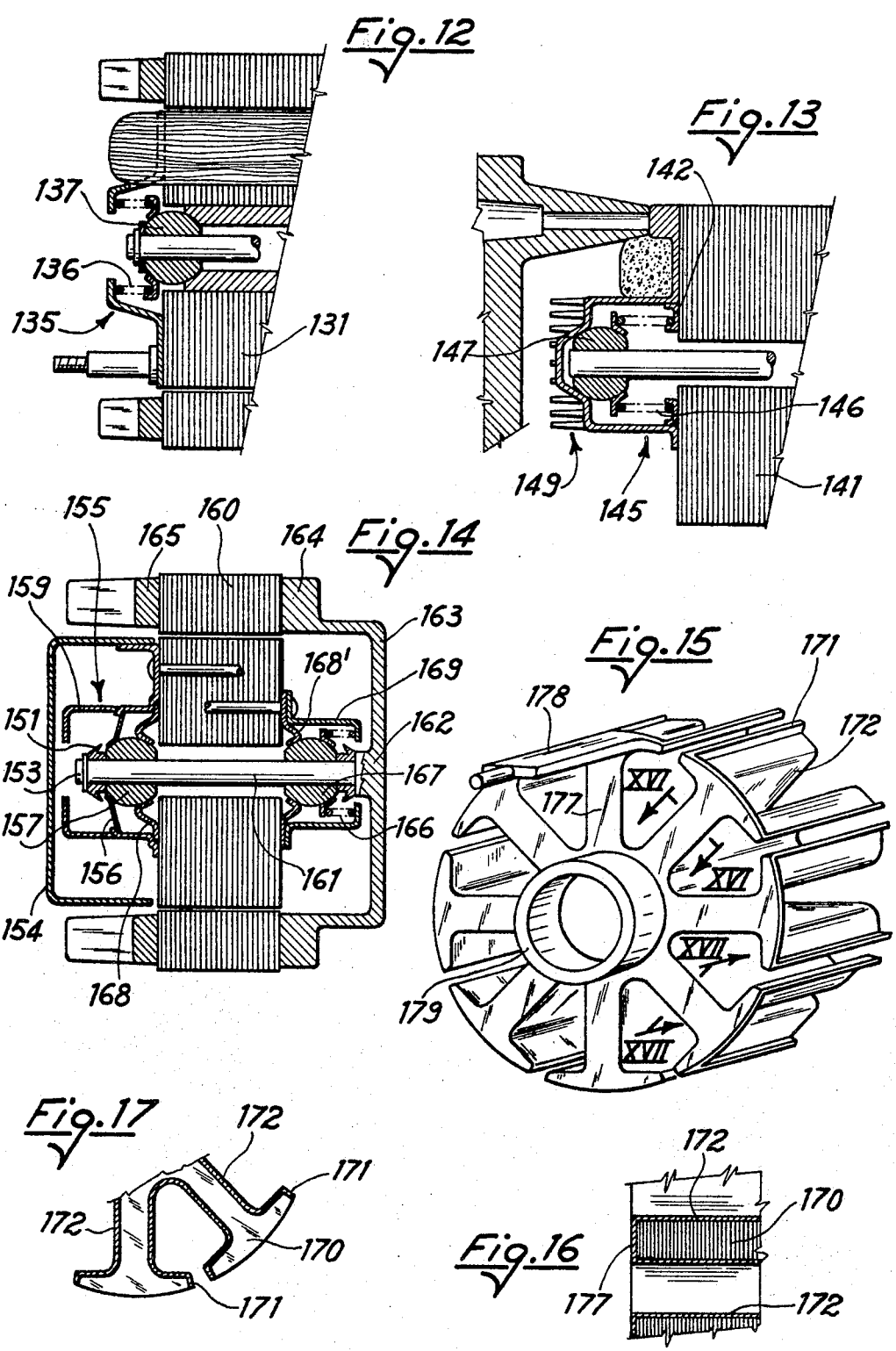

ROTARY ELECTRIC MACHINE OF THE IN-OUT TYPE PROVIDED WITH INTEGRAL STATOR SUPPORTING MEANS, COMPONENT FOR SAID MACHINE AND METHOD FOR ASSEMBLING THE SAME

This is a continuation, of application Ser. No. 804,755, filed Jun. 8, 1977, now abandoned.

BACKGROUND OF THE INVENTION

The denomination rotary electric machines of the "in-out" type, designates those rotary electric machines having the stator located internally of the rotor.

Since the rotary assembly surrounds and screens the stator on all its cylindrical surface and on one of its two end faces, in-out machines are not provided with covers or shields as found in traditional, non-in-out machines which house the bearings and, being rgidly connected to the stator, support both the stator and rotor assembly.

In the "in-out" machines all the external walls, except one, rotate and it is therefore only on the side of the non-rotating wall that it is possible to provide a rigid component adapted to connect the machine with a static bearing assembly.

Further in the "in-out" machines the housings of the bearings, which cannot be placed in the shields (which do not exist), are normally realized by two segments of a tube or by a single through tube inserted into a central bore of the stator, such tubes having seats at different diameters adapted on the one hand for insertion into the bore of the stator and on the other for housing and registering the bearing seat and accessory components thereof.

The tube, prolonged beyond the non-rotating wall, is normally used as a rigid component adapted to render the machine rigid with an external body since it axially passes through all or part of the stator and therefore is rigid therewith, whereas its projecting part is subject to bending and is connected at its end to a flange which rigidly connects it to any external static bearing element.

SUMMARY OF THE INVENTION

The in-out rotary electric machine which is the object of the present invention, on the contrary, is characterized in that the stator of ferromagnetic material is made rigid to at least one non-rotating element of the machine in correspondence to at least one of its faces which axially limit the essentially cylindrical space within which it is contained.

The non-rotating element or elements, made rigid with the stator, all have at least one face thereof juxtaposed to one of the end faces of the stator, or at least to a part of such faces, in correspondence with one or more polar expansions or poles, or with one or more teeth, or with the crown which connects the poles or teeth to one another at the center of the stator.

According to one aspect of the invention, the non-rotating elements, especially when they are juxtaposed to the poles or teeth, are at least in part covered by the heads of the winding, which therefore will have to be introduced into the cavities between the poles or the teeth, after the elements have been positioned.

The bonding action exerted by the winding is another characteristic of the invention, which by arranging a part of each of the non-rotating elements under the two heads, uses the winding itself to promote the rigid connection of the elements to the stator.

The successive impregnation of the winding with insulating varnish which dries or polymerizes thereon, when it is effected, positively contributes to this rigid connection.

Another characteristic of the electric machine of the invention is that the means used for maintaining in the correct position the non-rotating element (or elements) against the face of the stator during the assembling and the formation of the winding, is used as a means cooperating with the rigid connection of the element (or elements) to the face of the stator.

The non-rotating element (hereinafter the singular will be used although there may be a plurality of elements) made rigid with the stator, as stated hereinbefore, will be called for the sake of brevity "intermediate component", and in principle it is rigid, i.e. it has a precisely defined shape, even though it or part of it may be flexible or deformable either because it is thin and/or because of the material (such as metal, plastic matter, especially insulating such as nylon or the like) or materials of which it is made.

The intermediate component may be connected to or made rigid with other static elements forming a part of the machine or external thereto, and these latter may have various specific functions of their own. Such a static element may be for instance a protective shield, a screen for guiding the flow of cooling air, an insulation of the winding heads, a spacing member of the protection of the parts which are rotating or under current, an insulating base for electrical connections, a flange or base for connecting the machine to external bodies and/or for supporting it, and so on. The intermediate component may also be integral with a static element, e.g. such as one of those mentioned above. The intermediate component, or the body resulting from the union thereof with another static element, may also have additional and accessory functions or comprise parts having such functions, such as for instance guide surfaces for facilitating the winding of the stator wire. The intermediate component may be connected and made rigid with element extraneous to the machine, such as a utilization apparatus or a support plane. Since it is adapted to cooperate in the support of the machine or with the connection thereof to a fixed organ, it will also be called in the following description "support", or "support member" and/or "connecting member".

The "support" is fundamentally constituted by three parts:

(A) a first "inner" part, always present, which has the function of rendering the support solid with the stator, is in contact therewith, and after the winding has been completed, is located within the winding and precisely below the head of the winding itself, between it and the base of the cylinder which constitutes the stator, and in that zone extends mainly in a radial direction;

(B) a second, "outer" part, radially external to the winding head, which radially projects from under the head near the outer end of the poles or the teeth along which the aforesaid internal part extends; and (C) a third, "central" part, radially internal to the winding head;

The two last parts having the function of making the support rigid with an external body which supports the stator, or to a static component of the machine borne by the stator connected thereto.

The external part or the central part may be lacking, as will be better understood as the description proceeds.

These parts may, according to the invention, replace in whole or in part the above mentioned static component of the machine, which is thus directly rigidly connected to the stator by the means provided by this invention.

The "inner" part of the support, that is, the part which is in contact with the base of the stator cylinder, is so conformed as not to obstruct the stator cavities and to permit free inlet thereinto, so that, after the support has been positioned on the stator, the winding operations may be carried out without interference.

The "outer" part is preferably conformed so as to perform, besides the function of rigidly connecting the support to an external body or to a static part of the machine, also other functions, first of all that of spacing the stator from the external body so as to leave room therebetween for the winding head. Further it may contain, form, protect the head itself or act as a guiding means for the wire to enter into the cavity or on the head during the winding operation.

The "outer" part may be differently constructed depending on the shape of the stator and in particular on the number of the protruding poles or the number of teeth.

For instance, two opposed arms radially extending from under the head near the outer end of the poles, will be suitable for two-pole motors, which arms may be separate or joined in the "central" zone to form one element. In a four-pole motor the "external" part may assume the same shape and extend only along two of the poles, or it may assume the shape of a cross extending along the four poles. If the stator comprises several teeth, the outer part may have a number of arms equal to or higher than the number of teeth and be spider-shaped especially in triphase wound electrical machines or motors.

The "central" part is preferably conformed so as to perform, besides or instead of the function of rigidly connecting the support to an external body or to a static part of the machine, the same aforesaid functions which may performed by the outer part.

Further, the central part of the support preferably performs another important function, together with or in substitution of the aforementioned functions, that is that of containing a support of the rotor shaft and/or maintaining it centered with reference to the outer surface of the stator cylinder.

The support of the shaft may be constituted, as is well known, even by only one element, such as a ball-bearing, or a rigid smooth bushing, or may be constituted by a number of elements, such as a self-aligning smooth bushing, by a normally conical seat wherein the sleeve registers and self-aligns by a spring or any elastic element which retains the bushing in its seat.

One or more of the elements may, according to the present invention, be positioned within the central support part, or between it or the support and the wall and/or the bore of the stator, or between it and a wall abutting on or applied to the wall of the stator, or between it and a wall applied to the support itself.

In order to perform this function the central support part is preferably cup-shaped with its opening facing the wall of the sator, whereby to create a chamber within which the bearing or its parts are contained and/or registered.

According to another variant of the invention, the cup opening is closed by a wall made rigid therewith, so as to create a chamber within which the bearing and/or its parts are housed before it is closed, so that the support, before being positioned on the stator, already contains the bearing.

According to another variant the end wall of the cup may possess an opening through which one or more of the parts which constitute the bearing may be introduced into the cup.

The wall which closes the opening of the cup, when it exists, may possess openings for the passage of the shaft, the lubricant, or parts of the bearing.

The central part of the support may advantageously perform also the function of a reservoir for the lubricant necessary to the bearings, and/or of means for recovering the lubricant which flows out of the bearings and/or flows along the shaft and by centrifugal or capillary action is recovered in the central part.

A rotary electric machine comprising the support system, and a support as described, may advantageously be made while conforming the stator in its inner part so as to define therein, preferably in zones not crossed by the flux, chambers for the lubricant communicating at one of the ends with the chamber constituted by the central part of the support.

The support may be constructed of any desired material or of two materials, different but important advantages being obtained in such two cases.

If the support is made of a ferromagnetic material, the inner and central parts thereof are added to the useful ferromagnetic material of the stator and the electric efficiency of the machine is improved. If the support is made of an electrically insulating material, it insulates the winding head from the stator face and cooperates in making a doubly-insulated rotary electric machine. In this case the insulating cover constituted by the support itself may advantageously be prolonged along the inner surface of the cavities, so that the support replaces the traditional insulation of the cavities, and the motor insulation is greatly simplified.

That the cavity insulation is one body with the support and that both insulation and support are positioned on the stator in one operation, greatly simplifies the construction of the machine.

It is clear that the outer and/or the central part may be eliminated if their specific functions are not required.

The support, in its central part, may also be utilized only rotatively to support the rotor assembly through a bearing which the support contains and/or holds axially centered, and/or act as a reservoir for the lubricant.

BRIEF DESCRIPTION OF THE DRAWINGS

These and other characteristics of the present invention may be better understood from the non-limitative embodiments illustrated in the drawings, wherein:

FIGS. 1, 2, 3, 4 and 5 diagramatically illustrate the basic kinds of supports and the three fundamental parts thereof.

FIGS. 6, 7 and 8 illustrate various embodiments of outer support parts and various accessory functions which they perform.

FIGS. 9 and 10 illustrate various embodiments of the central support part, wherein such part contains a rotor shaft bearing and also illustrate a rotary electric machine provided with lubricant chambers and using a support according to the invention.

FIGS. 11 to 15 illustrate supports of a material which is a good conductor and their mounting on the stator, with functions of heat dissipation, and supports of insulating material also preferably having functions of thermal and/or electric insulation.

FIG. 16 and 17 fragmentarily represent details of the embodiment of FIG. 15 are cross-sections taken in the planes and the directions indicated by lines XVI—XVI and XVII—XVII respectively, in FIG. 15.

DETAILED DESCRIPTION OF THE INVENTION

In FIG. 1 there is reproduced an electric motor or machine of the in-out type, generally known, but provided with a support according to the invention, for the purpose of recalling its operation and clarifying the functions of its main components. It will be noted that the ferromagnetic parts of the rotor and of the stator have been schematically illustrated in their traditional structure as "laminar packets". The invention however is not limited to such a structure and the ferromagnetic bodies could be made otherwise, e.g. be sintered unitary blocks, or the like.

The rotary part of the machine is constituted by a shaft 1 which is made rigid through a hub 2 to a shield 3, in general cast together with the short-circuit rings 4 and 5 above the ferromagnetic core 6 of the rotor. The rotary portion is rotatively supported by two bearings 7 and 7', herein shown as bearings of a rolling friction type, but which may also be sliding friction bearings, either rigid or self-aligning. The bearings are usually contained in a tubular structure 8 protected by cover 9 and introduced into a bore 10 of the inner stator 11. Numeral 12 indicates the winding introduced in a cavity of the stator and numeral 13 indicates the head of the winding.

Numeral 14 designates a general structure to which the electric machine is to be connected or from which it is to be supported. It is evident that the only two static parts of the machine which face the general structure are the tubular structure 8 and the stator 11. It is known to support the machine by anchorage to the tubular structure 8 but this induces in this latter a harmful bending stress.

The support device according to the invention provides on the contrary an anchorage to the face of the stator, that is to one of the bases of the cylinder defined by the stator, and an anchorage on a surface perpendicular to the axis of the machine, viz. radial, such as the surface of the poles or the teeth which constitute such face.

The support 15 induces in the body 11 of the stator shearing stresses which are contrasted in part by the friction of the support 15 against the surface of the stator 11, friction due to the compression which the winding 12 with its heads 13 produces between the support 15 and the stator 11, and in part are contrasted by the bond constituted by the winding coils, in turn working under shearing stress between the zone 12 which is axially internal to the stator and the zone 13 which engages the support 15. Another part of these shearing stresses is discharged on the means employed for connecting the support 15 to the stator 11 before the winding operation, means which may be an adhesive, one or more rivets, or any other known means. Herein a rivet 16 is exemplified, which concurrently serves as a means for assembling the metal sheets from which the stator is built, if it is laminated, and for connecting the support 15 to the laminated stator core during the manipulations and the winding.

The support 15 which makes it possible to realize the connection and/or support method herein claimed, iss schematically illustrated herein in one of its possible embodiments. It comprises a part 17 internal to the winding which rigidly connects it to the stator 11 as hereinbefore set forth, and a part 18'–18", wherein the zone 18' has mainly the function of a spacing member and the zone 18" has the function of connecting the support to the generic fixed part 14 and includes means, not illustrated, for such connection.

The zone 18" may extend radially outwardly as shown in FIG. 1 or may extend radially inwardly as shown at 28" in FIG. 2, or may extend axially as shown at 38" in FIG. 3 or in any other direction.

One or more support elements 15 may be used. In FIG. 1 two are shown, the element 15 and the element 15', which are illustrated as separated from each other and which are rigidly connected with different poles or teeth of the stator 11. The element 15 is shown in cross-section and is connected to the stator 11 by the winding head 13, also shown in cross-section. The element 15' is shown in elevation view and the winding 12 hides the part 17' which it binds to the corresponding pole or tooth of the stator.

FIG. 2 represents only a variant in the outer part of the support, which extends radially inwardly towards the rotor axis. Therein 21 indicates the stator, 23 the cross-sectioned winding head, and 25 the support having an outer part 28" which contains and protects the head 23.

Furthermore the support 25 is here shown as composed of radially extending elements or arms which are connected by the central part 29 and which therefore form a solid support.

FIG. 3 represents a further variant in the outer part of the support.

In the figure, 31 is the stator, 32 the winding, 33 the cross-section of the winding head, and 35 and 35' the support shown partly in elevation and partly in cross-section.

The part of the support destined for connection with another element of the machine or with an external body, not shown, is indicated by 38" and extends mainly axially, and is provided with means to effect the desired connection, which means have been exemplified as consisting of suitable deformed ends.

FIG. 4 illustrates a support connected to another element or external body through its central part. In FIG. 4, 41 is the stator supported by the support 45 made rigid thereto by the winding head 43 which binds the two together, pre-binding means being optionally provided. The external element to be rigidly connected, through the support 45, to the stator 41 is indicated by 44. The support 45 is constituted by radial parts 47 rigidly connected with the stator and by a central part 49 solid therewith and comprising a spacing zone 49' which protects the winding heads 43, a zone 49" for the rigid connection to 44 and rigid connecting means 49'" here represented as nuts welded to the zone 49" but which could be different elements. The support of FIG. 4 is differentiated from those of the preceding Figures in that its part 49 which is rigidly connected with the external element 44 is radially internal of the part 47 which is rigidly connected with the stator 41, whereas in the preceding Figures the corresponding parts were radially external.

FIG. 5 illustrates a support 55 which possesses both a radially external part 58 and a radially internal part 59 for connecting stator 51 to other static bodies 54', 54", 54''' and 54$^{IV}$ by known means. Part 59 is here perforated to permit the passage of the shaft, or its assemblage, or anyway the passage of other bodies which may be desired to be introduced after mounting the support 55 on the stator 51.

The volume internal to part 59 may be occupied by other components or materials useful to the operation of the motor. Here for example the tube 52, analogous to tube 8 of FIG. 1, supporting the bearing, is shown as extending within such volume.

The preceding Figures are schematic illustrations of embodiments of the system for connecting the stator to another static component according to the invention. The following Figures illustrate supports according to the invention.

FIG. 6 illustrates in perspective view a support element corresponding to the system schematically illustrated in FIG. 1. Therein 61 indicates the stator, having a central bore 60 through which passes the shaft, not shown, and optionally a pipe containing the bearings. Numeral 65 indicates the support element, previously connected to the stator by rivets 66. The inner part 67 which is located, after the winding (here not shown) has been completed, beneath the winding head, is the part rigidly connected with the stator 61. The outer part extends first to form a spacing element 68' and thereafter to form a zone 68" which is destined to be rigidly bound to another static part to which the stator is to be connected.

FIG. 7 illustrates, in perspective view, a support 75 composed of four elements, each corresponding to a stator pole 71. Support 75 in this case, has not been rigidly connected with the stator prior to the winding operation and is therefore rigidly connected thereto only by the winding, here shown only on one pole, of which winding 72 is the part which extends longitudinally within the cavity, and 73 is the head which covers the support and binds it to the stator. The part 78''' of the support has here the function of guiding the wire to facilitate its introduction into the cavity during the winding operation.

FIG. 8 illustrates in perspective view a support 85 composed of various elements, which must be understood here, by way of example, as being as many as the teeth of the stator 81, in this particular case, eight. For the sake of simplicity and only for purposes of example, different constructive embodiments of supports have been illustrated on different of the stator teeth, for connecting to the teeth different elements or bodies to be made rigid with the stator.

The support 85, no matter which of the constructive embodiments is adapted, acquires the general shape of a spider having a central part 84 and radial extensions, only five of which, 85a, 85b, 85c, 85d and 85e, have been illustrated.

The five illustrated radial extensions have shapes different from one another, but of course in making a support, one and the same shape would be chosen for all extensions, and such shape need not necessarily be one of those illustrated, but could be different. The illustrated shapes require no explanation.

FIG. 9 illustrates in perspective view a support 95 which in its central part 99 performs the function of support of the ball bearing which bears the shaft and with it all the rotary parts of the machine. Therein 91 is the stator, 92 the winding, the head of which has been cut off at 94 to better show the support 95. This latter is rigidly connected to the stator 91 and is perfectly centered with the outer cylindrical surface thereof before the winding operation, for instance by means of rivets 96 only the heads of which are seen. The support comprises a part 97 which is internal to the winding and a part 98' which embraces the winding heads (not shown) and spaces the part 97 apart from a part 98" which serves to establish a rigid connection to an external body not shown. In the central part 99 the support is stamped to form a collar 99' in which the ball bearing 93, which rotatively bears the shaft and with it the whole rotary part, not shown, is mounted.

FIG. 10 illustrates in perspective view a support, a wall and a stator in the axial relationship required for assembling them but shown as spaced from one another, for the sake of clarity, in sections and of the Figure.

In section A there is illustrated a stator 101, illustrated for simplicity's sake as bipolar, but which could have a greater number of symmetric or non-symmetric poles or teeth. Therein 100 is a central bore for the passage of the rotor shaft, and optionally for creating a reserve of lubricant thereabout. Preferably the stator will also have a chamber 110 to create a reserve of lubricant and to contain the generally absorbent support means of the lubricant. These chambers, extending from one face of the stator to the other, may also serve to fill the chambers defined by the bearing housings on the two faces, feeding the lubricant on one part only.

On the face of the stator reference means 111 will be preferably defined, which are centered with the outer cylindrical surface of the stator and are adapted to properly position the wall of section B and/or other support section C.

In section B there is illustrated a wall 12 which may be free and in this case is held under pressure against the surface of the stator 101 by the elastic means which maintains the sliding bearing compressed in its seat, such elastic means and the bearing being known and not shown) or it may be rigidly connected with the stator 101 or with the support 105. If the stator 101 has chambers 110, the wall 112 will have openings 113 corresponding thereto. The wall will also possess reference means 114 coresponding to reference means 111 of the stator, a bore 115 for the passage of the shaft and a spherical or conical or otherwise shaped seat 116 which is perfectly centered with its reference means 114 and within which or against which the sliding bearing of the shaft will be housed.

In section C there is illustrated the support 105 with its internal part 107, outer part 108' and 108" and central parts 109.

The central part 109 has means, here shown by way of example as threaded bores 117, to connect it to another static part, not shown. The central part comprises a prevalently cylindrical part 109' and a prevalently flat part 109" on which there are preferably defined locking means 117 as well as an opening 118, when this latter is useful for the introduction or the assemblage of the various components of the support.

The wall 109" and the part of the wall 109' which is not in contact with the winding are preferably ribbed, for the purpose of cooling the chamber containing the bearing, the ribs not being shown.

The part 109' will have such a shape that only a very limited portion e.g. only the generatrix 119, will be in direct contact with the winding, or that it may be thermally insulated from the winding, so as to receive therefrom the minimum possible amount of heat.

The mounting of the three pieces of FIG. 10, or in some cases only of the two pieces of sections A and C is illustrated in cross-section in the following figures.

FIG. 11 illustrates in cross-section a support 125 mounted on a stator 121 and centered by means of elements 122. The winding, with its heads 123, maintains the support 125 in abutment with the stator and concurrently maintains under compression the elastic body 126 which thus compresses the spherical bushing 127 against its seat defined in the support 125. This latter is rigidly connected to the outer body 124 which thus supports the motor. Preferably, before the winding operation, the support 125 is rigidly connected to the stator 121 by means not shown, to prevent the reaction of the elastic body 126 against the stator from displacing the stator elements 122.

FIG. 12 illustrates in cross-section another embodiment of the mounting of a support 135 on a stator 121, wherein an oscillating bushing 137 is mounted within the support itself in a way that is reversed with respect to FIG. 11. Here the support 135 only operates to maintain under compression the elastic means 136 which urges the bushing 137 into its seat, and as a reservoir for the lubricant and means for recovering the lubricant forced out from the shaft by centrifugal force.

The mountings of FIGS. 11 and 12, as exemplified, do not include the plate element 12 described in FIG. 10. In this connection it is noted that the bearing seat of the oscillating bushing 137 may be defined otherwise, and that means may be provided for promoting the dissipation of heat from the bushing by conduction.

The mountings of FIGS. 13 and 14 exemplify, on the other hand, the use of the plate element.

In FIG. 13 a support is shown which has as a primary function the cooling of the bushing. The support 145 is of a conducting material and in its central part 149 it is ribbed in such a way as to remove heat from the bushing 127 which is placed in contact therewith. The plate 142 reacts against the elastic element 146 which maintains the bushing in its seat. In this case the plate is preferably firstly connected to the support 145 creating therein a bearing for the shaft, and then the support is rigidly connected to the stator 141.

To avoid the transmission of heat from the stator, the plate itself may be of insulating material.

FIG. 14 shows an in-out rotary electric machine provided with a support 155 according to the invention and also provided on the opposite side with a housing 169 for the bearing of the shaft 161 also constructed according to the invention.

The generally known in-out rotary electric machine, comprises a rotary and a fixed part. The rotary part is composed of the shaft 161, fixed by means of hub 162 to the bell 163 which is solid with the rings 164 and 165 which are solid in turn to the rotor 160.

The shaft is rotatively supported by two bearings, here shown as two self-aligning oscillating bushings 157 and 167. The two bushings are maintained in their seats by two elastic bodies 156 and 166. The seats of the bushings are defined in the two plates 168 and 168' which are provided with elements so that they may be centered with respect to the surface of the stator cylinder. The plates may be rigidly connected with the stator, or held against it by elastic means 156 and 166, or may be rigidly connected respectively with the support 155 or with the bearing housing 169, thus creating units which preferably contain all elements pertaining to bearing the shaft. The components of the support, as the bushings 157 and 167, the springs 156 and 166, the centrifugator 151, the locking ring 153, may be introduced into the chamber of the central part 159 of the support or into the chamber of the housing 169, either before they are solidly connected with the stator, or thereafter, through respective shaped openings. A body 154 which acts as a cover and/or as a support of the machine, is fitted or at any rate rigidly connected on the outer zone of the support 155.

FIGS. 15, 16 and 17 illustrate a support which performs, besides the functions described, also that of insulating the stator from the winding. The support is in this case made of an electrically insulating material and has the characteristics of extending along the lateral surfaces 172 of the cavities between the teeth 170 of the stator with extensions 171 which cover them. Extensions 178 of the support (only one of which being shown in FIG. 15) connect support to the outer body. Other extensions, not shown, for supporting the windings, assisting in making the connection, etc., may of course be defined on the support body. The inner part 177 is bound by the winding to the stator, whereas the central part 179 preferably contains a bearing according to one of the foregoing embodiments or extensions for facilitating windings and connections and may also be connected to other bodies or contribute to maintain the motor registered thereupon. Metal inserts may of course be provided in the support. A similar cover for the other bearing completes the insulation between stator and winding. Such other cover can be dispensed with, if the stator core is incorporated within the support itself, like a massive metal insert, during the molding thereof. This last variant is highly practical because it greatly reduces the geometric complexity of the support mold. Further, it saves the time and the labour required for positioning the support on the stator core.

I claim:

1. A rotary electric machine of the in-out type comprising:
an inner stator including a stator core of ferromagnetic material and at least one stator winding;
said stator core having substantially planar opposite faces and cavities;
said stator winding including internal portions housed in said cavities and head portions positioned axially external to said planar faces of said stator core;
an outer rotor supported for rotation about the axis of said stator; and
support means for connecting said stator to a static external structure, said support means comprising at least one plate-shaped rigid intermediate component including a portion in abutting contact with at least one of said planar opposite faces of said stator core and at least one of said head portions of said stator winding adjacent thereto; said portion of said support means being gripped between and in pressure engagement with said at least one planar opposite face and said at least one head portion due to the tension of said winding.

2. A machine as claimed in claim 1, wherein said static external structure is a static unit for supporting said stator.

3. A machine as claimed in claim 2, wherein said rigid intermediate component further includes extensions for connection to said static unit.

4. A machine as claimed in claim 1, wherein said portion of said rigid intermediate component comprises substantially radially extending members gripped between areas of said one planar opposite face which correspond to the poles of said stator core and the respective said head portions of said stator windings.

5. A machine as claimed in claim 4, wherein said rigid intermediate component further includes extensions which extend outwardly from under said head portions of said stator windings.

6. A machine as claimed in claim 1, wherein said rotor includes a shaft extending axially through said stator, and further comprising bearings supporting said shaft, and wherein said rigid intermediate component includes means for retaining at least one of said bearings.

7. A machine as claimed in claim 1, wherein said component has therein a chamber, and said stator has therein a chamber for containing lubricant and communicating with said chamber in said component.

8. A machine as claimed in claim 1, wherein said component includes means, independent of said stator winding, for securing said component to said stator in a predetermined positioned relationship.

9. A support member for attaching to a static external structure a rotary electric machine of the in-out type including an inner stator including a stator core of ferromagnetic material and at least one stator winding, the stator core having substantially planar opposite faces and cavities, the stator winding including internal portions housed in the cavities and head portions positioned axially external to the planar faces of the stator core, and an outer rotor supported for rotation about the axis of the stator, said support member comprising:

at least one rigid intermediate component including first portions adapted to be positioned in abutting contact with areas of at least one of the planar opposite faces of a stator core and gripped thereagainst by respective of the head portions of the stator windings of the stator due to the tension of said windings, and second portions connected to said first portions and extending therefrom for attachment to a static external structure.

10. A support member as claimed in claim 9, wherein said first portions extend radially with respect to the axis of the rotor, and wherein said first and second portions are connected by extensions projecting axially from the head portions, said extensions comprising means for spacing the stator from the static external structure.

11. A support member as claimed in claim 10, wherein said radially extending first portions are centrally connected to each other.

12. A support member as claimed in claim 9, wherein said rigid intermediate component includes portions which are radially external to the head portions and portions which are radially internal thereof.

13. A support member as claimed in claim 9, further comprising a central portion defining a housing for supporting a bearing of a shaft of the rotor of the machine.

14. A support member as claimed in claim 9, further comprising reference element means for centering the axis of a shaft of the rotor with the surface of the cylinder defined by the stator.

15. A support member as claimed in claim 9, further comprising central opening means for the introduction therethrough of a bearing for a shaft of the rotor.

16. A support member as claimed in claim 9, further comprising portions for protecting the head portions of the stator windings.

17. A support member as claimed in claim 9, further comprising portions for guiding the wires of the stator windings during winding thereof and attachment thereof to said rigid intermediate component.

18. A support member as claimed in claim 9, constructed at least in part of ferromagnetic material.

19. A support member as claimed in claim 9, constructed at least in part of insulating material.

20. A support member as claimed in claim 19, further comprising portions extending into the stator cavities and forming an insulating layer on the cavity walls, thereby forming means for insulating said cavity walls from the internal portions of the stator windings.

21. A support member as claimed in claim 20, including metal inserts.

22. A support member as claimed in claim 21, wherein said metal inserts comprise portions of the stator.

23. A support member as claimed in claim 20, including centrally positioned rib means for dissipating heat.

* * * * *